No. 895,475.

C. LA DOW, DEC'D.
R. A. LA DOW, EXECUTRIX.

PATENTED AUG. 11, 1908.

CLAMP APPLICABLE TO FASTENING THE TEETH OF HARROWS AND OTHER AGRICULTURAL IMPLEMENTS.

APPLICATION FILED AUG. 6, 1904.

Witnesses
Chas. K. Davis
John A. Daly

Inventor
Charles La Dow

UNITED STATES PATENT OFFICE.

CHARLES LA DOW, OF ALBANY, NEW YORK; ROBAH ALICE LA DOW EXECUTRIX OF SAID CHARLES LA DOW, DECEASED.

CLAMP APPLICABLE TO FASTENING THE TEETH OF HARROWS AND OTHER AGRICULTURAL IMPLEMENTS.

No. 895,475.      Specification of Letters Patent.      Patented Aug. 11, 1908.

Application filed August 6, 1904. Serial No. 219,748.

*To all whom it may concern:*

Be it known that I, CHARLES LA DOW, a citizen of the United States, and a resident of Albany, in the county of Albany and State of New York, have invented certain new and useful Improvements in Clamps Applicable to Fastening the Teeth of Harrows and other Agricultural Implements, of which the following is a specification.

My invention relates to clamps and consists in improvements which adapt them especially for fastening the teeth of agricultural implements in place, so as to render them easily adjustable relatively to their supports, without the use of bolts or nuts.

Figure 1:
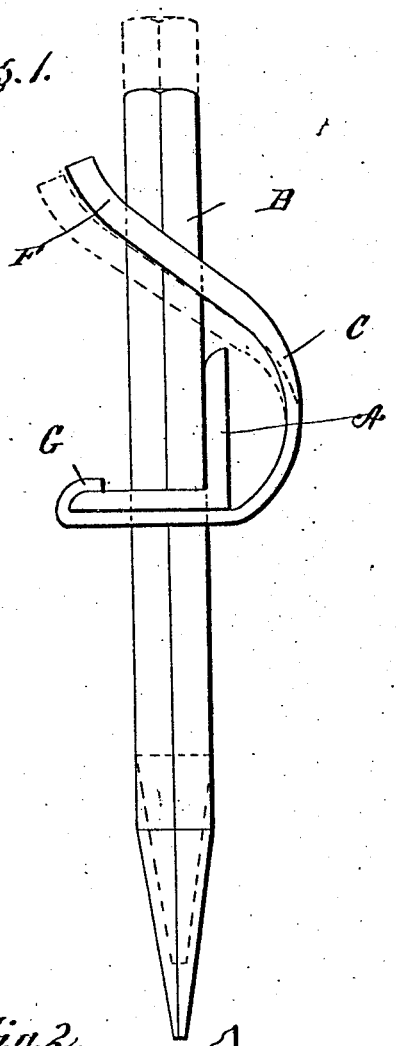
Figure 3:
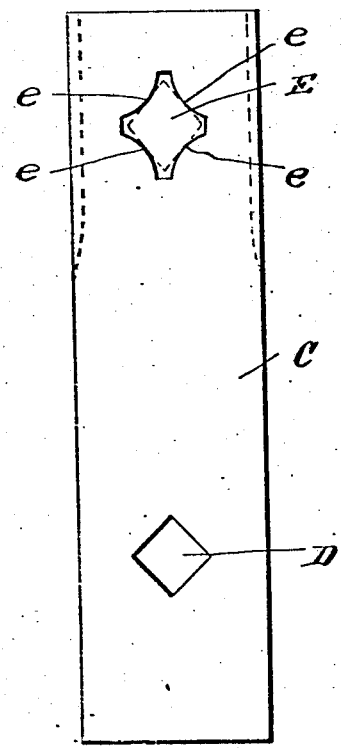
Figure 2:
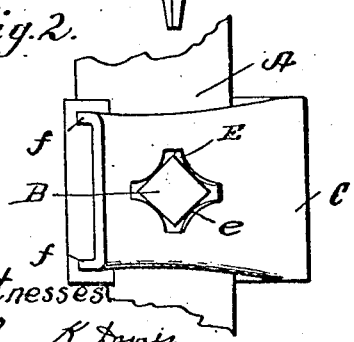
Figure 4:
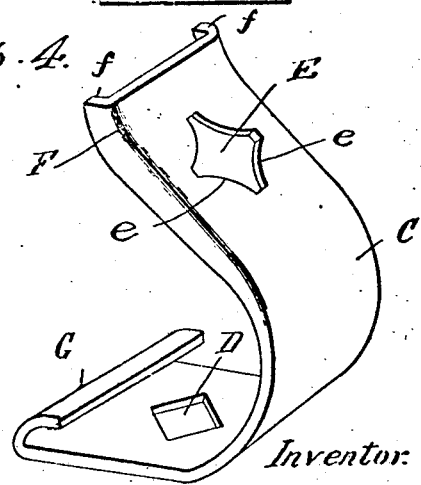

In the drawings, Figure 1 represents an end view of a harrow tooth bar having my invention applied thereto, and to a harrow tooth mounted on said bar; Fig. 2 illustrates a plan view of Fig. 1; Fig. 3 illustrates a blank from which my clamp is constructed; Fig. 4 illustrates a perspective view of my clamp detached.

I construct my clamp from a blank of flat steel, of suitable width and thickness, and preferably of such material as will take a spring temper. This blank, C, is perforated in two places, one of said perforations being a square hole, D, made diamond-wise in said blank, the other perforation, E, being made somewhat elliptical in form and having scolloped edges, shown at *e e e e*, which constitute "biting edges", for the purposes hereinafter described.

The spring, C, is bent into the form shown in Fig. 1, having a curved portion, F, which has flanges *f f*, which reinforce the spring across its weakest point in hole E. The other end of spring, C, has a hook, G, also shown in Fig. 1, which enables said spring to be self-gripping to a harrow tooth bar or beam, as clearly shown in Fig. 1.

The bar or beam, A, is perforated in such manner as to freely admit a tooth to readily enter and substantially fill said perforation. The parts A, B, and C, are assembled by locating the hooked end, G, of the spring, C, on the edge of the bar or beam, A, the point of the harrow tooth is then inserted in hole, E, and passed downward through the hole D in the harrow bar or beam and spring, thus bringing the parts into the position shown in Fig. 1. The tooth, B, may be driven downward into this position, or an instrument may be applied to the upper end of the spring at F and the spring can then be compressed, as shown by dotted lines in Fig. 1, and when said spring is thus compressed, the scalloped biting edges, *e*, relax their grip on the body of the tooth and the tooth can be slid freely upwardly and downwardly through the holes D and E.

It will be observed that the spring, C, formed substantially as shown, and assembled in substantially the manner described, forms what might be termed a "friction ratchet", which prevents the slightest upward movement of the tooth relatively to beam, A, but readily permits downward movement of said tooth relatively to beam, A.

It will also be observed that the scalloped edges *e* "bite" into the body of the tooth and not at the edges of the tooth, whereby the body portion of the tooth is made to take the wear and the corners of the tooth are kept from becoming roughened, which would occur if the spring had contact with the corners of the tooth. This fastening has but few parts, holds a tooth very securely, enables said tooth to be quickly inserted, adjusted, or withdrawn, without the use of bolts, nuts, or supplementary "binders". My fastening is also free from the liability to catch rubbish, because it conforms to the shape of the bar or beam to which it is applied.

I have shown the fastening as applied to a square spike tooth, but said fastening will hold a round tooth, or other form equally well.

I have illustrated and described my invention as mounted on an angle bar or beam, but it can obviously be applied to supports of other forms, and I do not limit myself to any special or peculiar shape of tooth which may be held therein, nor to any peculiar shape of bar, beam, or other support, on which my spring may be mounted, nor do I confine myself to any particular type of machine, implement, or article which may be used in connection with my clamp, but I claim broadly all the forms of construction in which my clamp may be embodied and all the uses to which it may be put, whenever and wherever found.

I claim:—

1. In combination with a supporting bar or beam, a clamp for fastening another member thereto, consisting of an elastic plate fashioned to engage at one end with the bar or beam and having a spring portion bent to overhang the support-engaging portion, said clamp having two perforations whose centers are substantially in alinement; and a member passing through said perforations and held in the clamp and locked to the beam or support through the cramping or binding of the spring portion of the clamp, tending to move away from the support-engaging portion.

2. In combination with a supporting bar or beam and with a tooth or member to be secured thereto, a clamp having a hook portion, said portion lying normally parallel with a wall or face of the support, and another and elastic portion normally oblique to said face of the support, both portions being perforated, substantially as shown, and the tooth or member to be held passing through said perforations, and through the bar, and being cramped or gripped by the walls of the elastic portion of the clamp, tending, by reason of its elasticity, to increase its obliquity to the axis of the tooth.

3. In combination with a member to be held, having a polygonal cross section, a clamp having a resilient member provided with a perforation having convex walls or gripping edges substantially as described and shown, whereby said edges are adapted to grip or bite into the flat faces of the polygonal member midway between the angles or boundaries of said faces, when the resilient member is left free to move into cramping position, thus concentrating the gripping effect upon restricted areas and leaving the angles of the polygonal member free and unmarred.

4. A clamp adapted to cramp or bind a body by being thrown into an oblique or cramping relation thereto, said clamp having a perforation provided with a series of curved walls with their convex faces toward the center of the perforation, said curved walls separated by short intervals, as and for the purpose set forth.

5. In combination with a supporting bar or beam, a spring clamp C, having a hook G to engage said supporting bar or beam and a resilient portion overhanging the same, said clamp being provided with perforations D and E; and a tooth or member B passing through the perforations D, E, and through the beam, and secured in position by the cramping or binding of the walls of the perforation E incident to the tendency of the spring portion of the clamp to resume its normal shape or position.

6. As a new article of manufacture, a clamp comprising a rigid portion having a hook G and a perforation D, and a resilient portion bent to stand obliquely to the rigid portion and provided with a perforation E.

7. As a new article of manufacture, a clamp having a rigid portion provided with a hook by which to engage a supporting bar or beam and with a perforation D, and a resilient portion bent to occupy a position oblique to the rigid portion, said resilient portion having a perforation E, and flanges F in that portion of its length occupied by the perforation E, substantially as and for the purpose set forth.

8. In combination with a supporting bar or beam A, a clamp C, having a hook G to engage said beam, and provided with a perforation D, and having also a resilient portion C, provided with a perforation E, and a tooth B passing through the perforations D, E and held to the clamp and the supporting bar or beam through the tendency of the resilient portion of the clamp to move from the position into which it is forced in inserting the tooth, to the position which it normally occupies.

In testimony whereof I have signed my name to this specification in the presence of two subscribing witnesses.

CHARLES LA DOW.

Witnesses:
A. M. PARKINS,
E. H. PARKINS.